(12) United States Patent
Cucchi et al.

(10) Patent No.: US 6,731,643 B1
(45) Date of Patent: May 4, 2004

(54) METHOD AND APPARATUS FOR ROUTING INFORMATION PACKETS ASSOCIATED TO ADDRESSES REPRESENTED THROUGH NUMERICAL STRINGS

(75) Inventors: Silvio Cucchi, Gaggiano (IT); Cristian Perissinotto, Annone Veneto (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/464,392

(22) Filed: Dec. 16, 1999

(30) Foreign Application Priority Data

Dec. 30, 1998 (IT) .......................................... TO98A1108

(51) Int. Cl.[7] .............................................. H04L 12/28
(52) U.S. Cl. ........................ 370/401; 709/238; 711/202
(58) Field of Search ................................. 370/389, 392, 370/400, 401, 411, 395.1, 395.3, 395.31, 395.32; 709/238, 239, 240, 241, 242; 711/202, 203, 204, 205, 206, 207, 211, 216

(56) References Cited

U.S. PATENT DOCUMENTS

| | | | |
|---|---|---|---|
| 5,386,413 A | | 1/1995 | McAuley et al. |
| 5,488,608 A | | 1/1996 | Flammer, III |
| 5,613,069 A | | 3/1997 | Walker |
| 5,946,679 A | * | 8/1999 | Ahuja et al. .................... 707/3 |
| 6,011,795 A | * | 1/2000 | Varghese et al. ............. 370/392 |
| 6,385,649 B1 | * | 5/2002 | Draves et al. ................ 709/224 |
| 6,434,144 B1 | * | 8/2002 | Romanov ..................... 370/392 |
| 6,522,632 B1 | * | 2/2003 | Waters et al. ................ 370/254 |
| 6,526,055 B1 | * | 2/2003 | Perlman ...................... 370/392 |

* cited by examiner

Primary Examiner—Kenneth Vanderpuye
Assistant Examiner—Bob A. Phunkulh
(74) Attorney, Agent, or Firm—Sughrue Mion, PLLC

(57) ABSTRACT

A method for routing information packets associated with addresses represented by numerical strings, in routing apparatuses for telecommunication networks, wherein the routing apparatus receives information packets at their input and routes the packets on a plurality of outputs. The method builds a first set of numerical strings with variable length, and contains the strings in an address table. The method then compares a first address, incoming at the input and associated to an information packet, with said first set of numerical strings according to a longest prefix match criterion and using a binary search for performing the comparison. The comparison further includes building a second set of numerical strings contained in a sorted extended address table wherein the table is derived from the first set of numerical strings and the second set of numerical strings is derived from the first set of numerical strings using a building-by-intervals method which operates on the intervals defined by the numerical strings belonging to said first set of numerical strings.

39 Claims, 2 Drawing Sheets

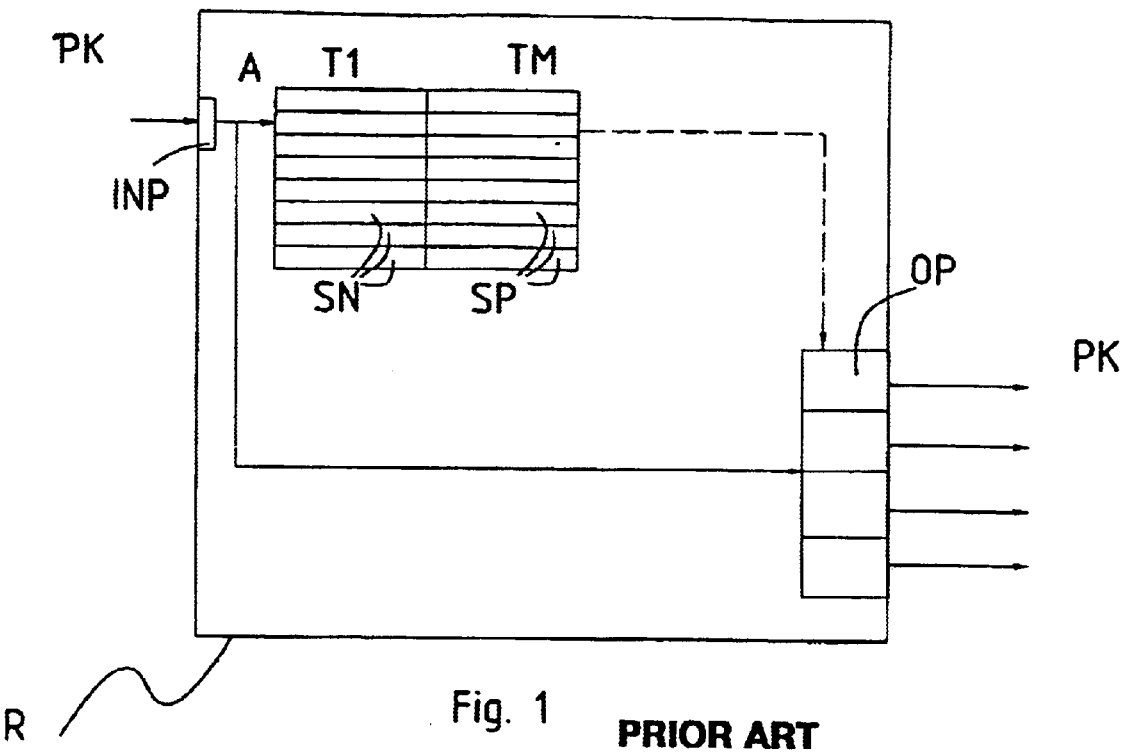
Fig. 1 PRIOR ART
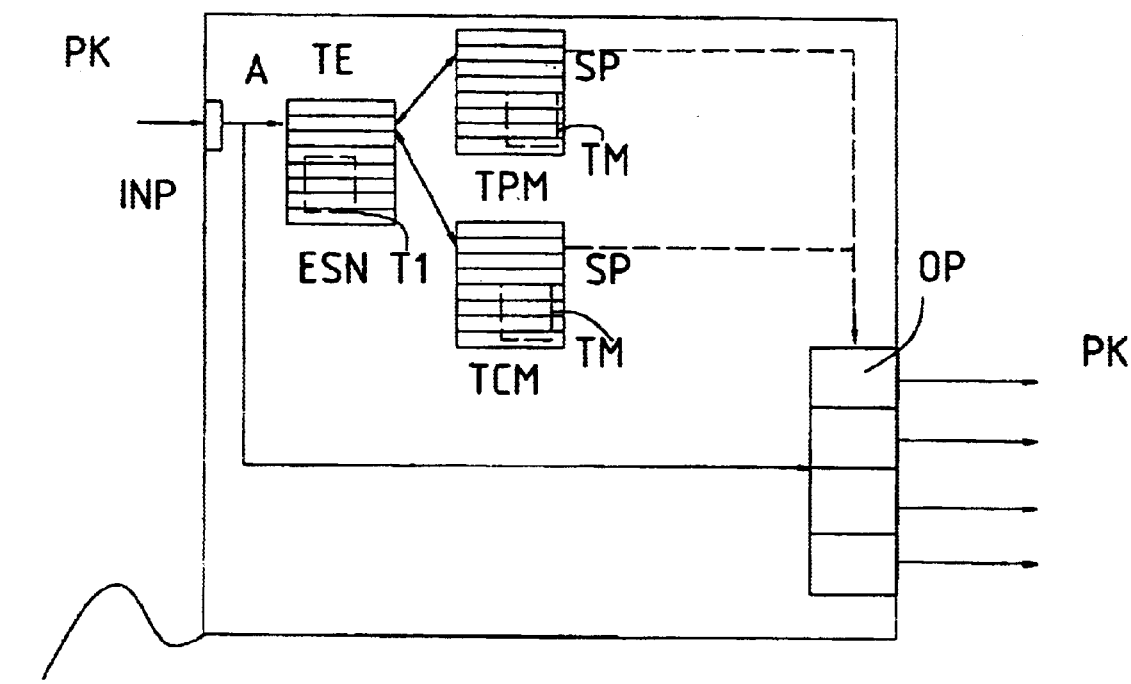
Fig. 2

METHOD AND APPARATUS FOR ROUTING INFORMATION PACKETS ASSOCIATED TO ADDRESSES REPRESENTED THROUGH NUMERICAL STRINGS

BACKGROUND OF THE INVENTION

1. Field of the Invention

The present invention relates to a method for routing information packets associated to addresses represented through numerical strings, in routing apparatus, utilized in telecommunication networks, receiving at their input information packets and routing said packets on a plurality of outputs, said method comprising the steps of:

building a first set of numerical strings with variable length, contained in an address table being sorted and associated to a set of references at the outputs, said set of references at the outputs being inserted in a sorted mapping table;

comparing a first address incoming at the input with said first set of numerical strings according to a longest prefix match principle and using a binary search as a method for performing the comparison.

2. Description of the Prior Art

The "longest prefix match" problem occurs in many applications in communication networks, such as a recovery of routing information in switches or ATM (Asynchronous Transfer Mode) switches and in IP (Internet Protocol) networks routers.

For instance, an IP router is an apparatus receiving at its input packets provided with address and routing them according to their address on its various output ports, which will then address them towards various "host computers" or sets of "host computers". Each "host computer" or router in Internet has an IP address, which codes the number defining the pertaining network and the number defining the computer itself. The configuration originating the IP address is unique and two machines cannot share the same IP address. IP addresses have a 32-bit length and are inserted in the source address and destination address fields of IP packets.

IP addresses are divided, for instance, in four fields with each field being of 8 bits, so that an IP address will be typically expressed with values ranging from 0.0.0.0 to 255.255.255.255.

Each router contains a table inside. Said table contains a list of IP addresses corresponding to a table containing a list of output ports leading to other routers or other host computers.

FIG. 1 shows a basic diagram of a router R according to the known state of the art. A packet PK structured according to Internet Protocol reaches an input port INP. An address A representing one of the available IP addresses, contained in said packet PK, is extracted and sent to an address table T1 corresponding to an output port mapping table TM. The address table T1 contains an original set of strings SN, i.e. numerical strings representing addresses, whereas the mapping table TM contains a set of references SP associated to output ports OP. The address table T1 and the mapping table TM may take for instance the values shown in the Table 1 which is here below.

Values 128, 128.3.4 and 128.0.1.2 indicated therein form an original set of strings SN, while 0, 1 and 2 represent the references SP associated with the output ports OP.

TABLE 1

| T1 | TM |
|---|---|
| 128. | 0 |
| 128.3.4 | 1 |
| 128.0.1.2 | 2 |

Considering the above division of IP addresses in 8-bit fields, the length L of the numerical strings ranges from a minimum 8-bit length LMIN to a maximum 32-bit length LMAX. Moreover, it can be noticed that the address A always has a 32-bit length, equal to the maximum length LMAX provided by the system.

A search is usually performed on the original set of strings SN utilizing the well-known longest prefix match criterion, so as to compare each string SN with the address A. A prefix with length L of a numerical string SN means a sequence equal to the first L-bits of the numerical string SN.

Several search methods by the longest prefix match criterion have been suggested. The most obvious one provides a sequential scanning of the whole original set of strings SN contained in the address table T1, comparing every element of it with the address A incoming at the input port INP and storing the longest match which is obtained. It is obvious that the complexity of a method of this kind is depending linearly on the number of strings available in the search set contained in the address table T1, resulting in its restricted usefulness when such a number of strings increases or in applications requiring an extremely high search speed. Other methods use special data arrangements, such as tree structures. Thus, calculation complexity can be reduced, although the need of using the so-called back-tracking techniques, i.e. storing the choices performed along the path in the tree structure, will considerably reduce the advantages of such a technique. Also the managing and updating difficulties of the data structures employed should be added.

A most efficient method for a complete match search is based on the well-known binary search, also called dichotomy search: once the set of strings to be used for performing the search is sorted, said method allows to check either the presence or absence of a value with a complexity $O(\log_2 N)$, where N is the cardinality of the search set. The binary search method will loose much of its efficiency whenever it is used to calculate the longest prefix match; however, there is a possibility of sorting the search set in more subsets according to the length of the numerical strings and carry out more binary searches on such subsets. Such an approach has the drawback of requiring more search iterations to reach the desired result.

SUMMARY OF THE INVENTION

It is the object of the present invention to solve the above drawbacks and provide a method for routing information packets associated to addresses represented through numerical strings, in routing apparatuses, utilized in telecommunication networks, receiving at their input information packets and routing said packets on a plurality of outputs, said method having a more efficient and improved performance.

In this frame, it is the main object of the present invention to provide a method for routing information packets associated to addresses represented through numerical strings, in routing apparatuses, utilized in telecommunication networks, receiving at their input information packets and routing said packets on a plurality of outputs, said method using a binary search procedure for calculating the longest prefix match without requiring repeated iterations of said binary search procedure.

In order to achieve such objects, the present invention provides a method for routing information packets associated to addresses represented through numerical strings, in routing apparatuses, utilized in telecommunication networks, which receive at their input information packets and route said packets on a plurality of outputs, and/or an apparatus of routing information packets in telecommunication networks, incorporating the features of the annexed claims, which form an integral part of the description herein.

Further objects, features and advantages of the present invention will become apparent from the following detailed description and annexed drawings, which are provided by way of exemplifying and non limiting example,

BRIEF DESCRIPTION OF THE DRAWINGS

In the drawings:

FIG. 1 shows a basic diagram of a method for routing information packets associated to addresses represented through numerical strings, in routing apparatuses, utilized in telecommunication networks, receiving at their input information packets and routing said packets on a plurality of outputs, according to the present state of the art;

FIG. 2 shows a basic diagram of a method for routing information packets associated to addresses represented through numerical strings, in routing apparatuses, utilized in telecommunication networks, receiving at their input information packets and routing said packets on a plurality of outputs, according to the present invention;

BEST MODE FOR CARRYING OUT THE INVENTION

Figure 3:
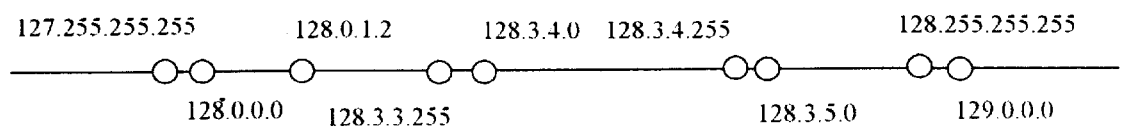
FIG. 3 shows a diagram of a first example of a set of numerical strings based on the method for routing information packets associated to addresses represented through numerical strings, in routing apparatuses, utilized in telecommunication networks, receiving at their input information packets and routing said packets on a plurality of outputs, according to the present invention.

FIG. 2 shows a basic diagram of a method for routing information packets associated to addresses represented through numerical strings, in routing apparatuses, utilized in telecommunication networks, receiving at their information packets and routing said packets on a plurality of outputs, according to the present invention. The present invention is based on the use of an extended address table TE, which is greater than the address table T1, from which it is derived as explained later, jointly with the use of a complete match mapping table TCM and one or more partial match mapping tables, in particular, e.g. a partial match mapping table TPM. According to the present invention, the result of a complete match binary search on an extended set of strings ESN contained in the extended address table TE is used to calculate the longest prefix match of the address A at the input with respect to the original set of strings SN contained in the address table T1.

The extended set of strings ESN is built on the basis of the original set of strings SN according to a building-by-intervals method, which can be better understood introducing the following statement.

Once the maximum length LMAX of the strings SN has been established, it is possible to consider a space $Z(2^{LMAX})$, which is the set formed by the non-negative integers that can be represented with LMAX bits. For instance, LMAX is worth 32. A string SN with a length LMAX, i.e. 32 bits, within said space $Z(2^{LMAX})$ represents a point. Each string SN whose length L is shorter than LMAX, for instance L=24, clearly represents, on the contrary, an interval consisting of $2^{LMAX-L}$ values or strings, ranging between an extreme lower string SI, i.e. the completion to LMAX bits of the string SN having a length L and all bits equal to 0, and an extreme upper string SU, i.e. the completion to the LMAX bits of the string SN with a length L and all bits equal to 1. Thus, a set of points and intervals can be associated to the original set of strings SN in the space $Z(2^{LMAX})$ and, given an address A consisting of a sequence of LMAX bits at the input, also consider it as an element of $Z(2^{LMAX})$, in particular an element represented by a point. Therefore, the longest prefix can be identified determining to which interval in the space $Z(2^{LMAX})$ defined by the strings SN the representative point of the address A belongs to. In the case of a complete match, the corresponding interval is also a point.

Thus, the method of building-by-intervals of the set of extended strings ESN provides the following steps:
  considering each string as belonging to the original set of strings SN and evaluating its length L;
  if the length L is equal to the maximum length LMAX, the string will be introduced in the extended set of strings ESN;
  if the length L of the string belonging to the original set of strings SN is shorter than the maximum length LMAX in the extended set of strings ESN, then an extreme lower string SI, an extreme upper string SU, an external lower string SI1 and an external upper string SU1 will be introduced.

The external lower string SI1 identifies the point directly preceding the point identified by the extreme lower string SI, whereas the external upper string SU1 identifies the point directly subsequent to the point identified by the extreme upper string SU.

The function of said external lower string SI1 and external upper string SU1 is to allow the management of possibly generated nested intervals in the extended address table TE, as better explained in the following.

The extended set of strings ESN so obtained is sorted by crescent order in the extended address table TE.

Moreover, also the complete match mapping table for TCM and the partial match mapping table TPM are created, which contain references SP fully equivalent to those contained in the mapping table TM associated to the address table T1 but with a different sorting and structure.

The complete match mapping table TCM obtained by sorting the references SP identifying the output ports OP on the base of the strings SN contained in the address table T1, is associated to the extended address table TE when the binary search operated on the extended set of strings ESN converges to a value equal to the value of the input address A, i.e. a complete match is reached. Thus, the complete match mapping table TCM contains, at least once, each reference SP included in the mapping table TM.

The partial match mapping table TPM is utilized if the binary search on the extended set of strings ESN converges to a different value from the value represented by the address A at the input. The partial match mapping table TPM is obtained, in its turn, through inserting repeated times the references SP associated to the respective strings SN with a length L shorter than LMAX, so as to cover the intervals indicated in the extended address table TE by the extended set of strings ESN.

Therefore, the method for routing information packets associated to addresses represented through numerical strings, in routing apparatuses, utilized in telecommunication networks, receiving at their input information packets and routing said packets on a plurality of outputs, according to the present invention, provides the steps of:

building an original set of strings SN in an address table T1, which is associated to a set of references SP at the output ports OP in a mapping table TM;

building an extended set of strings ESN in an extended address table TE adopting a method of building-by-intervals, associated to a complete match mapping table TCM and partial match mapping table TPM, said tables containing multiple occurrences of the references SP contained in the mapping table TM;

performing a binary search in the extended address table TE upon receipt of a packet PK with associated an address A at its input;

if said binary search converges towards the string ESN in its k-th position, where k is a general order index, comparing the resulting string ESN with the address A;

if the resulting string ESN matches with the address A, the reference SP present in k-th position in the complete match mapping table TCM is provided and the packet PK sent to the corresponding output port OP;

if the resulting string ESN does not match with the address A, the reference SP present in k-th position in the partial match mapping table TPM is provided and the packet PK sent to the corresponding output port OP.

An example is now illustrated to clarify the operation of the method for routing information packets associated to addresses represented through numerical strings, in routing apparatuses, utilized in telecommunication networks, receiving at their input information packets and routing said packets on a plurality of outputs, according to the present invention.

Let us assume that the address table T1 contains the original set of strings SN shown in Table 1 and the longest prefix for the special address A equal to 128.2.1.3 has to be identified.

If only the extreme lower string SI and the extreme upper string SU of the intervals 128. and 128.3.4 are introduced, i.e. neither the external lower string SI1 nor the external upper string SU1 are inserted to manage the nested intervals, the extended set of strings ESN obtained according to the building-by-intervals method will consist of the values represented in FIG. 3, while the extended address search table TE, the complete match mapping table TCM and the partial match mapping table TPM are those reported in Table 2.

TABLE 2

| TE | TCM | TPM |
|---|---|---|
| 0.0.0.0 | NC | NC |
| 128.0.0.0 | 0 | 0 |
| 128.0.1.2 | 2 | 0 |
| 128.3.4.0 | 1 | 1 |
| 128.3.4.255 | 1 | 1 |
| 128.255.255.255 | 0 | 0 |
| 255.255.255.255 | NC | NC |

Reference NC in Table 2 indicates "no match".

In general, the binary search for the address A may converge towards the point 128.0.1.2 or towards the point 128.3.4.0 of the extended set of strings ESN; in the first instance, since the resulting value is different from the searched one, the correct reference SP with value 0 would be returned, whereas in the second case a wrong reference SP with value 1 would be associated.

Figure 4:
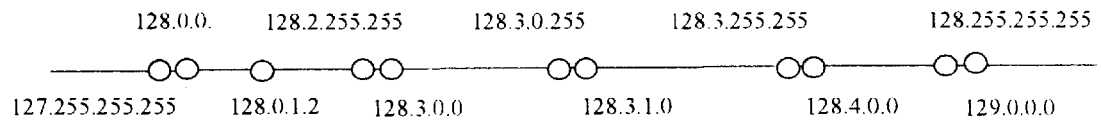
FIG. 4 shows a diagram of a second example of a set of numerical strings based on the method for routing information packets associated to addresses represented through numerical strings, in routing apparatuses, utilized in telecommunication networks, receiving at their input information packets and routing said packets on a plurality of outputs, according to the present invention.

The problem is solved just introducing also the external lower string SI1 and the external upper string SU1, which let the internal interval be maintained separate from the external interval; the new extended set of strings ESN so obtained is represented in FIG. 4.

Table 3 shows the extended address table TE and the mapping tables TCM and TPM: in this case it can be easily verified how the convergence tends to the point 128.0.1.2 or towards the point 128.3.3.255 of the extended set of strings ESN and how the returned reference SP is always the correct one, i.e. value 0.

TABLE 3

| TE | TCM | TPM |
|---|---|---|
| 0.0.0.0 | NC | NC |
| 127.255.255.255 | NC | NC |
| 128.0.0.0 | 0 | 0 |
| 128.0.1.2 | 2 | 0 |
| 128.3.3.255 | 0 | 0 |
| 128.3.4.0 | 1 | 1 |
| 128.3.4.255 | 1 | 1 |
| 128.3.5.0 | 0 | 0 |
| 128.255.255.255 | 0 | 0 |
| 129.0.0.0 | NC | NC |
| 255.255.255.255 | NC | NC |

A second example is now reported, wherein identification of the longest prefix for the address A is considered equal to 128.3.0.2, in the assumption that the address table T1 consists of the original set of strings SN represented in Table 4.

TABLE 4

| T1 | TM |
|---|---|
| 128. | 0 |
| 128.0.1.2 | 1 |
| 128.3. | 2 |
| 128.3.0. | 3 |

Figure 5:
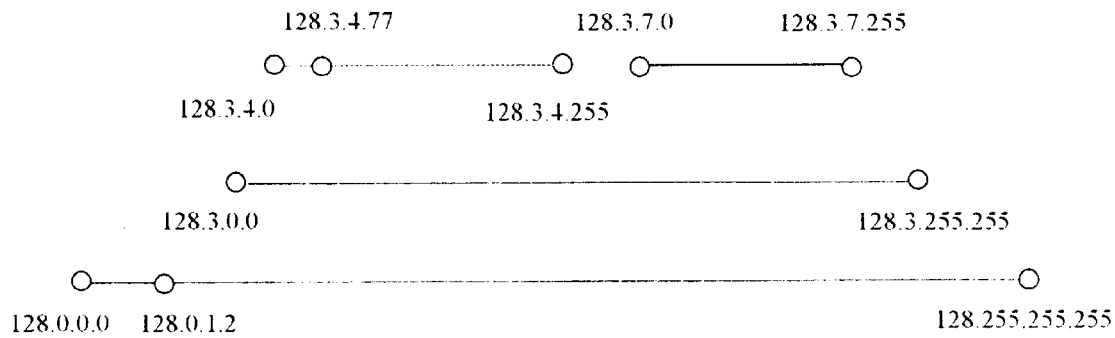
FIG. 5 shows a diagram of a third example of a set of numerical strings based on the method for routing information packets associated to addresses represented through numerical strings, in routing apparatuses, utilized in telecommunication networks, receiving at their input information packets and routing said packets on a plurality of outputs, according to the present invention.

It is obvious that in building the extended set of strings ESN overlapping strings ESN will ensue, i.e. identifying the same point in the space $Z(2^{LMAX})$. In this case, only one overlapping string ESN is inserted in the extended address table TE. The set of strings ESN so obtained is represented in FIG. 5.

Table 5, on the contrary, reports the consequent extended address tables TE, as well as mapping tables TCM and TPM.

TABLE 5

| TE | TCM | TPM |
|---|---|---|
| 0.0.0.0 | NC | NC |
| 127.255.255.255 | NC | NC |
| 128.0.0.0 | 0 | 0 |
| 128.0.1.2 | 1 | 0 |
| 128.2.255.255 | 0 | 0 |
| 128.3.0.0 | 3 | 3 |
| 128.3.0.255 | 3 | 3 |
| 128.3.1.0 | 2 | 2 |
| 128.3.255.255 | 2 | 2 |
| 128.4.0.0 | 0 | 0 |
| 128.255.255.255 | 0 | 0 |
| 129.0.0.0 | NC | NC |
| 255.255.255.255 | NC | NC |

Looking at the table 5 it can be seen that the string ESN 128.3.0.0 in the extended address table TE is obtained both from the 16-bit string SN 128.3. of the address table T1 and from the 24-bit string SN 128.3.0. of the address table T1: each time the binary search converges towards the string ESN 128.3.0.0 in the extended address table TE, the returned SP reference is set on value 3 instead of value 2. In other words, if the same string ESN is built starting from strings SN with a different length L, said string ESN will be associated to the reference SP, which was associated to the longest string SN in the address table T1.

The search of the address A equal to 128.3.0.2 can converge either to the string ESN 128.3.0.0 or to the string ESN 128.3.255.255: in both cases a complete match is not reached and the reference SP contained in the table TPM in the corresponding position, i.e. value 3, will be utilized.

This second example offers the opportunity of highlighting another advantage deriving from the use of mapping tables TCM and TPM. Let us assume that the address table T1 has to be changed eliminating the string SN 128.3.0. Due to the availability of mapping tables TCM and TPM it is not necessary to completely re-calculate the extended set of strings ESN and mapping tables TCM and TPM, nor it is required to perform any packing operations, which may determine a displacement of large portions of said tables. In order to obtain an equivalent result, it will be enough to change the references contained in the table TCM and table TPM, as shown in Table 6.

In this case, the binary search of the address A equal to 128.3.0.2 supplies the reference SP corresponding to the string SN 128.3., which represents the longest correct prefix after cancellation of the string SN 128.3.0. Also, if it is desired to introduce a new string in the original set of strings SN, updating can be efficiently performed through the sorting of the extended address table TE, which allows direct calculation of the positions wherein the new strings ESN have to be inserted. As to the enable and disable operations of a string SN in the address table T1, which differ from the cancellation and insertion operations since they do not entail a change of the original set of strings SN, similar considerations apply, i.e. they can be efficiently obtained by properly updating the references contained in the mapping tables TCM and TPM.

TABLE 6

| TE | TCM | TPM |
|---|---|---|
| 0.0.0.0 | NC | NC |
| 127.255.255.255 | NC | NC |
| 128.0.0.0 | 0 | 0 |
| 128.0.1.2 | 1 | 0 |
| 128.2.255.255 | 0 | 0 |
| 128.3.0.0 | 2 | 2 |
| 128.3.0.255 | 2 | 2 |
| 128.3.1.0 | 2 | 2 |
| 128.3.255.255 | 2 | 2 |
| 128.4.0.0 | 0 | 0 |
| 128.255.255.255 | 0 | 0 |
| 129.0.0.0 | NC | NC |
| 255.255.255.255 | NC | NC |

As it will be appreciated, both the minimum value and maximum value of the space $Z(2^{L_{max}})$ are always introduced in the extended set of strings ESN, i.e. in the examples 0.0.0.0 e 255.255.255.255., even though the corresponding strings SN are not reported in the address table T1. The presence of said values is necessary for upper and lower delimitation of the extended set of strings ESN and be able to manage any address A at the input in the same way.

Let us now describe a first embodiment of the method for routing information packets associated to addresses represented through numerical strings, in routing apparatuses, utilized in telecommunication networks, receiving at their input information packets and routing said packets on a plurality of outputs, according to the present invention.

Said first embodiment is applied to a simplified case where the length L of the strings SN can only take two values. This occurs e.g. in the event of routing apparatuses apt to route packets according to the ATM (Asynchronous Transfer Mode) protocol. If the length L can only take two values, this will exclude the presence of nested intervals.

Therefore, a method of building-by-intervals of a simplified extended set of addresses ESN1 can be used, according to which:

- each string is considered belonging to the original set of strings SN and its length L is evaluated;
- if the length L is equal to the maximum length LMAX, the string is introduced in the extended set of strings ESN1;
- if the length L of the string belonging to the original set of strings SN is shorter than the maximum length LMAX, both the extreme lower string SI and the extreme upper string SU are introduced in the extended set of strings ESN1. The first embodiment of the method for routing information packets associated to addresses represented through numerical strings, in routing apparatuses, utilized in telecommunication networks, receiving at their input information packets and routing said packets on a plurality of outputs, according to the present invention, also requires a different selection criterion of the mapping tables TCM and TPM according to the resulting string ESN1;
- if the resulting string ESN1 matches with the special address A, the reference SP present in k-th position in the complete match mapping table TCM is provided;
- if the resulting string ESN1 does not match with the address A, but has a partial match, the reference SP present in k-th position in the partial match mapping table TPM is provided;
- if the resulting string ESN1 has a null match with the address A, then the "no match" information is directly provided.

Let us now describe a second embodiment of the method for routing information packets associated to addresses represented through numerical strings, in routing apparatuses, utilized in telecommunication networks, receiving at their input information packets and routing said packets on a plurality of outputs, according to the present invention. This second embodiment utilizes the same method of building-by-intervals of the extended set of strings ESN1 as for the simplified type related to the first embodiment. Accordingly, if the length L of the string belonging to the original set of strings SN is shorter than the maximum length LMAX, both the extreme lower string SI and the extreme upper string SU are introduced in the extended set of strings ESN1.

However, a higher number of mapping tables is provided to also manage the nested intervals. The general principle is to provide a number LMAX of mapping tables sorted by increasing length TML. If the string ESN1 resulting from the binary search is in k-th position, the common length J of the common prefix between the address A and the resulting string ESN1 is calculated and the reference SP present in k-th position in the j-th mapping table sorted by crescent length TML provided. By way of simplification, since, as it is known, the lengths L of the string prefixes SN can take a limited number NP of separate values, only NP mapping tables sorted by their crescent length TML can be utilized.

TABLE 7

| T1 | TM |
|---|---|
| 128 | 0 |
| 128.3.4 | 1 |
| 128.3.7 | 2 |
| 128.3 | 3 |
| 128.0.1.2 | 4 |
| 128.3.4.77 | 5 |

Operation of the second embodiment of the method for routing information packets associated to addresses represented through numerical strings, in routing apparatuses, utilized in telecommunication networks, receiving at their input information packets and routing said packets on a plurality of outputs, according to the present invention, is now clarified with reference to the tables 7 and 8.

Tables 7 represents the original set of strings SN, for which the number NP is worth 4, since the prefixes can only have an 8, 16, 24 o 32 bit length. Let 128.3.5.125 be the address A at the input.

Table 8 represents the extended address table TE containing the extended set of strings ESN1, together with 4 mapping tables sorted by crescent length, indicated with TML_8, TCM_16, TML_24, TML_32, respectively.

The binary search may converge towards the string ESN1 128.3.4.255 or towards the string ESN1 128.3.7.0: in both cases the address A and the resulting string ESN1 have the first 16 bits in common, so that the reference SP utilized is the one available in the mapping table sorted by crescent length TML_16, matching on 16 bits. As it can be easily verified, 128.3 is actually the longest prefix for the address A at the input.

TABLE 8

| TE | TML_8 | TML_16 | TML_24 | TML_32 |
|---|---|---|---|---|
| 0.0.0.0 | NC | NC | NC | NC |
| 128.0.0.0 | 0 | 0 | 0 | 0 |
| 128.0.1.2 | 0 | 0 | 0 | 4 |
| 128.3.0.0 | 0 | 3 | 3 | 3 |
| 128.3.4.0 | 0 | 3 | 1 | 1 |
| 128.3.4.77 | 0 | 3 | 1 | 5 |
| 128.3.4.255 | 0 | 3 | 1 | 1 |
| 128.3.7.0 | 0 | 3 | 2 | 2 |
| 128.3.7.255 | 0 | 3 | 2 | 2 |
| 128.3.255.255 | 0 | 3 | 3 | 3 |
| 128.255.255.255 | 0 | 0 | 0 | 0 |
| 255.255.255.255 | NC | NC | NC | NC |

TABLE 8-continued

If the address A at the input takes the value 128.3.4.72, the binary search may converge either to the string ESN1 128.3.4.0 or to the string ESN1 128.3.4.77: in both cases the common prefix is 24-bit long, and the reference SP provided is 1, i.e. the value present in the mapping table sorted by crescent length TML_24, at 24 bit: it can be verified straightaway that 128.3.4 is a correct prefix.

A third embodiment of the method for routing information packets associated to addresses represented through numerical strings is now described, which is substantially similar to the second embodiment, since it provides a simplified method of building-by-intervals of the extended set of strings ESN1, and the issue of several mapping tables. However, said third embodiment allows limitation of said mapping tables to the number of four, independently from the value of the number NP.

In fact, the complete match mapping table TCM, a mapping table for maximum match TMM, a table of the prefix length PLT and a mapping table for external match TEM are utilized. The complete match mapping table TCM maintains the role previously described. The mapping table for maximum match TMM contains in its k-th position the reference SP to the longest usable prefix of the corresponding string ESN1 in the extended address table TE, whereas the length of such a prefix is stored in the k-index location of the length table of the prefix PLT. Thinking in terms of intervals, for each point represented by a string ESN1 in the extended address table TE, the maximum match mapping table TMM contains the reference SP related to the pertaining more internal interval in the nesting, and the prefix PLT length table contains the corresponding nesting level. The external match mapping table TEM contains for each point represented by a string ESN1 in the extended address table TE the reference SP to the first more external interval than the interval referred to by the contents of the maximum match mapping table TMM.

Operation of the third embodiment of the method for routing information packets associated to addresses represented through numerical strings, according to the present invention is as follows: given the address A at the input, a binary search is performed on the extended set of strings ESN1; assuming that the search converges to the position k in the extended address table TE, the address A is compared with the resulting string ESN1. If they are equal, the reference SP contained in the corresponding position, i.e. k-th, of the complete match mapping table TCM is utilized; otherwise the length of the common prefix for the address A and the resulting string ESN1 is calculated. If such a length matches the length stored in k-th position in the length table of the prefix PLT, the reference SP present in the maximum match mapping table TMM is utilized to identify the longest prefix. Otherwise the reference SP present in the external match mapping table TEM is utilized. As shown in the following examples, insertion of the intervals data and storage of the information identifying for each point the more internal location interval and the first more external interval will lead to correct identification of the longest prefix.

In order to highlight the differences between the second and third embodiment, we go back to the example introduced for the second embodiment, i.e. the search of the longest prefix for the address A with value 128.3.5.125 in the original set of strings SN of table 7.

The extended address table TE and auxiliary tables TMM, TCM, TEM, PLT utilized by the third embodiment are illustrated in Table 9.

Figure 6:
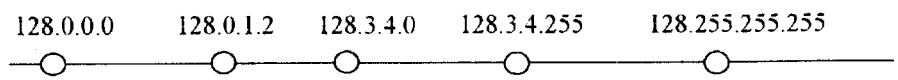
FIG. 6 shows a diagram of an example of a set of numerical strings based on a change to the method for routing information packets associated to addresses represented through numerical strings, in routing apparatuses, utilized in telecommunication networks, receiving at their input information packets and routing said packets on a plurality of outputs, according to the present invention.

Moreover, FIG. 6 shows a graphic representation of the extended set of strings ESN1 highlighting the intervals nesting levels.

The search of the address A 128.3.5.125 may converge towards the string ESN1 128.3.4.255 or towards the string ESN1 128.3.7.0. In both cases the address A and the resulting string ESN1 have the first 16 bits in common. The reference SP shown in the mapping table TMM cannot be utilized to calculate the longest prefix, since it refers to a match on 24 bits.

The correct reference SP is the one stored in the mapping table for the external match TEM, i.e. 3.

TABLE 9

| TE | TCM | TMM | PLT | TEM |
|---|---|---|---|---|
| 0.0.0.0 | NC | NC | 0 | NC |
| 128.0.0.0 | 0 | 0 | 8 | NC |
| 128.0.1.2 | 4 | 0 | 8 | NC |
| 128.3.0.0 | 3 | 3 | 16 | 0 |
| 128.3.4.0 | 1 | 1 | 24 | 3 |
| 128.3.4.77 | 5 | 1 | 24 | 3 |
| 128.3.4.255 | 1 | 1 | 24 | 3 |
| 128.3.7.0 | 2 | 2 | 24 | 3 |
| 128.3.7.255 | 2 | 2 | 24 | 3 |
| 128.3.255.255 | 3 | 3 | 16 | 0 |
| 128.255.255.255 | 0 | 0 | 8 | NC |
| 255.255.255.255 | NC | NC | 0 | NC |

This example highlights the need of the external match mapping table TEM: if this table were not available when the reference SP in the maximum match mapping table TMM becomes unusable, then moving along the extended address table TE would be necessary to identify the directly more external interval. However, since the number of moves is unknown in advance there would be the risk of loosing the advantages of the method according to the present invention.

The search of the address A value 128.3.4.72 converges towards the string ESN1 128.3.4.0 or towards the string ESN1 128.3.4.77. In both cases the match is on 24 bits, which is a value equal to the value present in the length table of the prefix PLT. Therefore, the reference SP contained in the maximum match mapping table TMM can be utilized, i.e. e value 1, which is correct.

From the above description the features of the present invention are clear and also its advantages are obvious.

Advantageously, the method for routing information packets associated to addresses represented through numerical strings, in routing apparatuses, utilized in telecommunication networks, receiving at their input information packets and routing said packets on a plurality of outputs, makes use of a binary search method to calculate the match of the longest prefix without requiring more iterations of the binary search method. This result is obtained generating a new set of numerical strings on which the binary search is operated, said new set of numerical strings being derived from the original set defining the mapping of the output ports, substantially indicated in the intervals defined by the strings of the original set, whose length is shorter than the maximum one.

The method for routing information packets associated to addresses represented through numerical strings, in routing apparatuses, utilized in telecommunication networks, receiving at their input information packets and routing said packets on a plurality of outputs, according to the present invention, is advantageously adaptable to any format of the numerical strings representing the addresses of the information packets to be routed. This, in particular, makes it compatible both for its use in routers operating according to Internet Protocol and for switches operating according to the Asynchronous Transfer Mode.

Moreover, the method for routing information packets associated to addresses represented through numerical strings, in routing apparatuses, utilized in telecommunication networks, receiving at their input information packets and routing said packets on a plurality of outputs, according to the present invention, advantageously allows suppression, disabling and re-enabling of addresses in the original address table, without changing the extended table generated on which the binary search is performed, but simply modifying the references to the output ports in the mapping tables. This is rather important since modifications to the original address table are quite frequent, particularly in Internet Protocol, so that multiple re-calculation and packing operations would be required for the table itself It is obvious that many changes are possible for the man skilled in the art to the method for routing information packets associated to addresses represented through numerical strings, in routing apparatuses, utilized in telecommunication networks, receiving at their input information packets and routing said packets on a plurality of outputs described above by way of example, without departing from the novelty spirit of the innovative idea, and it is also clear that in practical actuation of the invention the components may often differ in form and size from the ones described and be replaced with technical equivalent elements.

What is claimed is:

1. A method for routing information packets associated with addresses represented by numerical strings through routing apparatuses in a telecommunication network, wherein the routing apparatuses receive at their input information packets and route said packets on a plurality of outputs, said numerical strings by identifiable by at least part of a prefix, said method comprising:

building a first set of numerical strings with variable length and contained in an address table, said address table being sorted and associated to a set of references to the outputs, said set of references being inserted in a mapping table;

comparing a first address, incoming at the input and associated to an information packet, with said first set of numerical strings according to a longest prefix match criterion using a binary search method for performing the comparison, and utilizing the resulting reference to address the information packet to the corresponding output, wherein said comparing includes:

providing for building a second set of numerical strings, contained in a sorted extended address table, said sorted extended table being derived from the first set of numerical strings; and wherein said second set of numerical strings is derived from the first set of numerical strings using a building-by-intervals method, operating on the intervals defined by the numerical strings belonging to said first set of numerical strings.

2. The method according to claim 1, said method further including:
  associating to the second set of numerical strings a complete match mapping table and a set of partial match mapping tables containing at least the references contained in the mapping table;
  in case said binary search converges towards the string in k-th position in the sorted extended address table, comparing a resulting string with the first address;
  if the resulting string matches with the first address, providing the reference present in k-th position in the complete match mapping table;
  if the resulting string does not match with the first address, providing the reference present in k-th position in one of the partial match mapping tables.

3. The method according to claim 2, wherein said building-by-intervals method of the second set of strings comprises:
  taking in account each spring belonging to the first set of numerical strings and evaluate its length;
  if said length is equal to a maximum length, introducing the string in the second set of numerical strings;
  if the length of the string belonging to the first set of numerical strings is shorter than the maximum length, introducing at least an extreme lower string and an extreme upper string of maximum length in the second set of numerical strings, which strings express the interval defined by the string belonging to the first set of numerical strings.

4. The method according to claim 3, wherein said building-by-intervals method of the second set of strings, should the length of the string belonging to the first set of numerical strings be shorter than the maximum length, will also introduce an external lower string and an external upper string of maximum length, in the second set of numerical strings, said external lower string being adjacent to and preceding the extreme lower string, whereas said external upper string is adjacent to and subsequent to the extreme upper string.

5. The method according to claim 3, wherein the set of partial match mapping tables consists of a unique partial match mapping table.

6. The method according to claim 5, wherein:
  if the resulting string matches with the first address at the input, providing the reference present in k-th position in the complete match mapping table;
  if the resulting string does not match with the first address at the input but has a partial match, providing the reference present in k-th position in one of the partial match mapping table;
  if the resulting has a null match with the first address, directly providing a "no match" information.

7. The method according to claim 3, wherein said method further comprises:
  building a set of mapping tables sorted by increasing length through the set of partial match mapping tables and the complete match mapping table;
  calculating, if the resulting string through the binary search is in k-th position, a common length of the common prefix between the address at the input and the resulting string;
  returning the reference present in k-th position in the j-th mapping table sorted by crescent length.

8. The method according to claim 7, wherein the number of said mapping tables sorted by increasing length is equal to the maximum length of the strings belonging to the first set of numerical strings.

9. The method according to claim 7, wherein the number of said mapping tables sorted by increasing length is equal to a number of different lengths that may be taken by the strings belonging to the first set of numerical strings.

10. The method according to claim 3, wherein the set of partial match mapping tables consists of a maximum match mapping table and an external match mapping table and that, moreover, they are associated to a prefix length table.

11. The method according to claim 10, wherein said maximum match mapping table contains in k-th position the reference to the longest prefix usable for the corresponding numerical string in the extended address table, whereas the length of said prefix is stored in k-th position of the prefix length table, whereas the external match mapping table contains for each string in k-th position of the extended address table the reference to the first more external interval with respect to the interval referred to by the reference contained in k-th position of the maximum match mapping table.

12. The method according to claim 3, wherein a cancellation step is provided for one or more numerical strings from the first set of numerical strings, said cancellation step being followed by the sole modification of the references contained in the set of the partial match mapping tables and in the complete match mapping table.

13. The method according to claim 3, wherein an enabling or disabling step is provided for one or more numerical strings from the first set of numerical strings, said enabling or disabling step being followed by the sole modification of the references contained in the set of partial match mapping tables and in the complete match mapping table.

14. A routing apparatus, utilized in telecommunication networks, receiving at its input information packets, associated with addresses represented by numerical strings and routing said packets on a plurality of outputs, said routing apparatus comprising:
  a mapping unit configured to build a first set of numerical strings with variable length, said strings being contained in an address table, said address table being sorted and associated to a set of references to the outputs, said set of references being inserted in a mapping table;
  a comparison unit configured to comparing a first address, incoming at the input and associated to an information packet, with said first set of numerical strings according to a longest prefix match criterion using a binary search method for performing the comparison, and utilizing the resulting reference to address the information packet to the corresponding output, wherein said comparing unit further includes:
    a build mechanism configured to build a second set of numerical strings, contained in a sorted extended address table, said sorted extended table being derived from the first set of numerical strings; and
  wherein said second set of numerical strings is derived from the first set of numerical strings using a building-by-intervals unit, said building by intervals unit operating on the intervals defined by the numerical strings belonging to said first set of numerical strings.

15. The routing apparatus according to claim 14, said apparatus further including:
  an associating unit for associating to the second set of numerical strings a complete match mapping table and a set of partial match mapping tables containing at least the references contained in the mapping table;

wherein in case said binary search converges towards the string in k-th position in the sorted extended address table, comparing a resulting string with the first address;

if the resulting string matches with the first address, providing the reference present in k-th position in the complete match mapping table;

if the resulting string does not match with the first address, providing the reference present in k-th position in one of the partial match mapping tables.

16. The routing apparatus according to claim 15, wherein said building-by-intervals unit of the second set of strings comprises:

an accounting unit for taking in account each string belonging to the first set of numerical strings and evaluate its length, wherein if said length is equal to a maximum length, introducing the string in the second set of numerical strings;

if the length of the string belonging to the first set of numerical strings is shorter than the maximum length, introducing at least an extreme lower string and an extreme upper string of maximum length in the second set of numerical strings, which strings express the interval defined by the string belonging to the first set of numerical strings.

17. The routing apparatus according to claim 16, wherein said building-by-intervals unit of the second set of strings, should the length of the string belonging to the first set of numerical strings be shorter than the maximum length, will also introduce an external lower string and an external upper string of maximum length, in the second set of numerical strings, said external lower string being adjacent to and preceding the extreme lower string, whereas said external upper string is adjacent to and subsequent to the extreme upper string.

18. The routing apparatus according to claim 16, wherein the set of partial match mapping tables consists of a unique partial match mapping table.

19. The routing apparatus according to claim 18, wherein said building by interval unit further comprises a matching unit configure to perform the following steps:

if the resulting string matches with the first address at the input, providing the reference present in k-th position in the complete match mapping table;

if the resulting string does not match with the first address at the input but has a partial match, providing the reference present in k-th position in one of the partial match mapping tables;

if the resulting has a null match with the first address, directly providing a "no match" information.

20. The routing apparatus according to claim 16, wherein said apparatus further comprises:

a building unit configured to build a set of mapping tables sorted by increasing length through the set of partial match mapping tables and the complete match mapping table;

a calculation unit configured to calculate, if the resulting string through the binary search is in k-th position, a common length of the common prefix between the address at the input and the resulting string;

a reference returning unit configured to return the reference present in k-th position in the j-th mapping table sorted by crescent length.

21. The routing apparatus according to claim 20, wherein the number of said mapping tables sorted by increasing length is equal to the maximum length of the strings belonging to the first set of numerical strings.

22. The routing apparatus according to claim 20, wherein the number of said mapping tables sorted by increasing length is equal to a number of different lengths that may be taken by the strings belonging to the first set of numerical strings.

23. The routing apparatus according to claim 16, wherein the set of partial match mapping tables consists of a maximum match mapping table and an external match mapping table and the maximum match mapping table and external match mapping table are associated to a prefix length table.

24. The routing apparatus according to claim 23, wherein said maximum match mapping table contains in k-th position the reference to the longest prefix usable for the corresponding numerical string in the extended address table, whereas the length of said prefix is stored in k-th position of the prefix length table, whereas the external match mapping table contains for each string in k-th position of the extended address table the reference to the first more external interval with respect to the interval referred to by the reference contained in k-th position of the maximum match mapping table.

25. The routing apparatus according to claim 14, wherein a cancellation unit is provided for one or more numerical strings from the first set of numerical strings, said cancellation unit configured to modify the references contained in the set of the partial match mapping tables and in the complete match mapping table.

26. The routing apparatus according to claim 14, wherein an enabling or disabling unit is configured to provide one or more numerical strings from the first set of numerical strings, said enabling or disabling unit further configures to modify the references contained in the set of partial match mapping tables and in the complete match mapping table.

27. A computer program product for enabling a computer to route information packets associated with addresses represented by numerical strings through a routing apparatus, said computer program product comprising:

software instructions for enabling the computer to perform predetermined operations, and a computer readable medium bearing the software instructions;

the predetermined operations including the steps of:

building a first set of numerical strings with variable length and contained in an address table, said address table being sorted and associated to a set of references to outputs, said set of references being inserted in a mapping table;

comparing a first address, incoming at an input and associated to an information packet with said first set of numerical strings according to a longest prefix match criterion using a binary search method for performing the comparison, and utilizing the resulting reference to address the information packet to the corresponding output, wherein said comparing includes:

providing for building a second set of numerical strings, contained in a sorted extended address table, said sorted extended table being derived from the first set of numerical strings; and wherein said second set of numerical strings is derived from the first set of numerical strings using a building-by-intervals method, operating on the intervals defined by the numerical strings belonging to said first set of numerical strings.

28. The computer program product according to claim 27, further including instructions for:

associating to the second set of numerical strings a complete match mapping table and a set of partial match mapping tables containing at least the references contained in the mapping table;

in case said binary search converges towards the string in k-th position in the sorted extended address table, comparing a resulting string with the first address;

if the resulting string matches with the first address, providing the reference present in k-th position in the complete match mapping table;

if the resulting string does not match with the first address, providing the reference present in k-th position in one of the partial match mapping tables.

29. The computer program product according to claim 28, wherein said building-by-intervals method of the second set of strings comprises:

taking in account each string belonging to the first set of numerical strings and evaluate its length;

if said length is equal to a maximum length, introducing the string in the second set of numerical strings;

if the length of the string belonging to the first set of numerical strings is shorter than the maximum length, introducing at least an extreme lower string and an extreme upper string of maximum length in the second set of numerical strings, which strings express the interval defined by the string belonging to the first set of numerical strings.

30. The computer program product according to claim 29, wherein said building-by-intervals method of the second set of strings, should the length of the string belonging to the first set of numerical strings be shorter than the maximum length, will also introduce an external lower string and an external upper string of maximum length, in the second set of numerical strings, said external lower string being adjacent to and preceding the extreme lower string, whereas said external upper string is adjacent to and subsequent to the extreme upper string.

31. The computer program product according to claim 29, wherein the set of partial match mapping tables consists of a unique partial match mapping table.

32. The computer program product according to claim 29, wherein:

if the resulting string matches with the first address at the input, providing the reference present in k-th position in the complete match mapping table;

if the resulting string does not match with the first address at the input but has a partial match, providing the reference present in k-th position in one of the partial match mapping table;

if the resulting has a null match with the first address, directly providing a "no match" information.

33. The computer program product according to claim 29, wherein said the computer program product further includes instructions for:

building a set of mapping tables sorted by increasing length through the set of partial match mapping tables and the complete match mapping table;

calculating, if the resulting string through the binary search is in k-th position, a common length of the common prefix between the address at the input and the resulting string;

returning the reference present in k-th position in the j-th mapping table sorted by crescent length.

34. The computer program product according to claim 33, wherein the number of said mapping tables sorted by increasing length is equal to the maximum length of the strings belonging to the first set of numerical strings.

35. The computer program product according to claim 33, wherein the number of said mapping tables sorted by increasing length is equal to a number of different lengths that may be taken by the strings belonging to the first set of numerical strings.

36. The computer program product according to claim 29, wherein the set of partial match mapping tables consists of a maximum match mapping table and an external match mapping table and that, moreover, they are associated to a prefix length table.

37. The computer program product according to claim 36, wherein said maximum match mapping table contains in k-th position the reference to the longest prefix usable for the corresponding numerical string in the extended address table, whereas the length of said prefix is stored in k-th position of the prefix length table, whereas the external match mapping table contains for each string in k-th position of the extended address table the reference to the first more external interval with respect to the interval referred to by the reference contained in k-th position of the maximum match mapping table.

38. The computer program product according to claim 29, wherein a cancellation step is provided for one or more numerical strings from the first set of numerical strings, said cancellation step being followed by the sole modification of the references contained in the set of the partial match mapping tables and in the complete match mapping table.

39. The computer program product according to claim 29, wherein an enabling or disabling step is provided for one or more numerical strings from the first set of numerical strings, said enabling or disabling step being followed by the sole modification of the references contained in the set of partial match mapping tables and in the complete match mapping table.

* * * * *